March 1, 1955 L. L. R. THOMAS 2,703,034
AUTOMATIC PROJECTOR FILM LOADER AND THREADER
Filed March 13, 1951
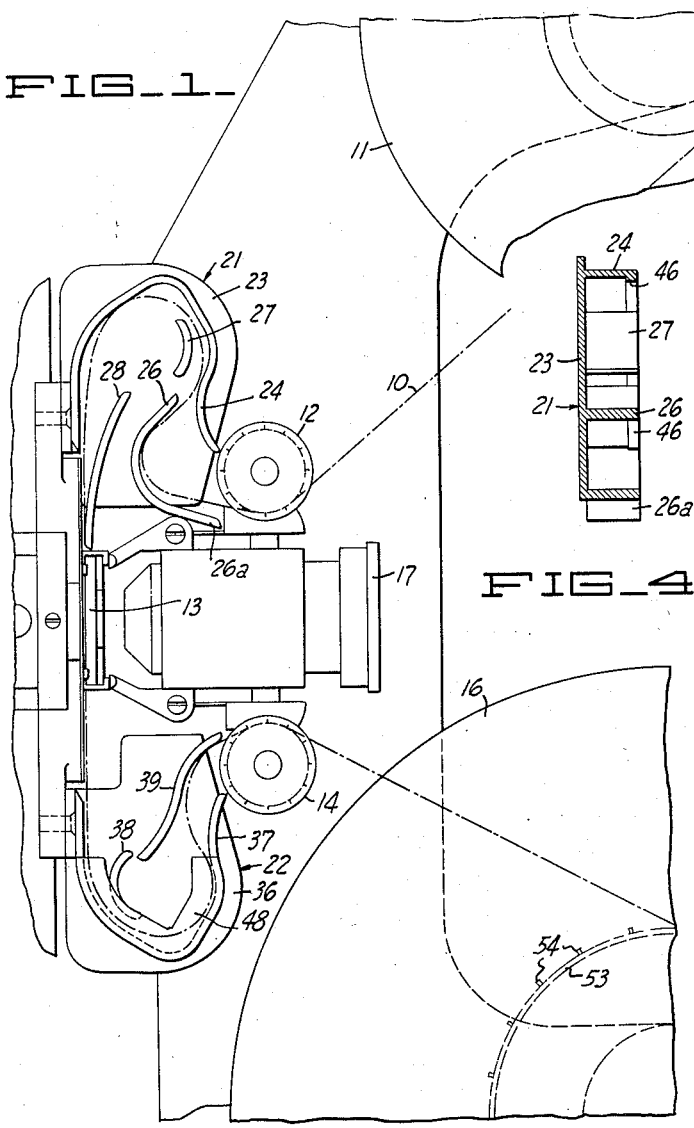
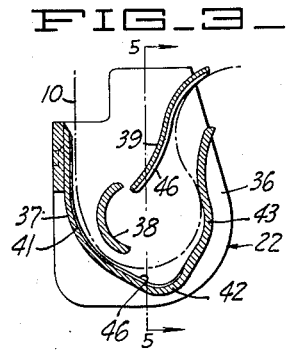
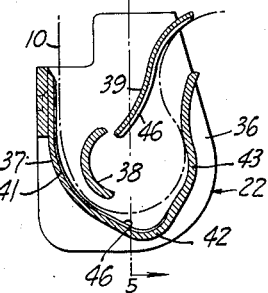
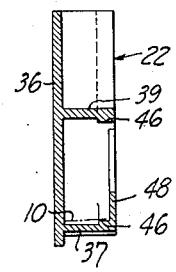
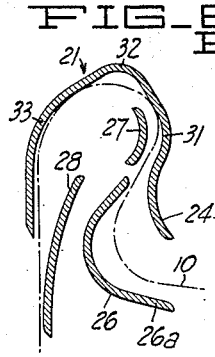
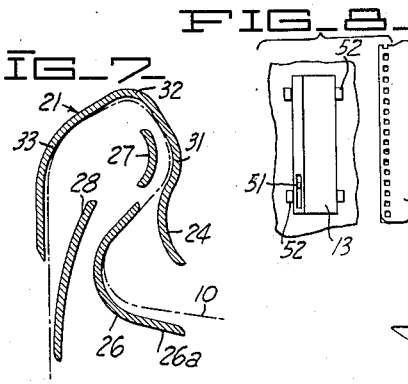
INVENTOR.
Leonard L. Thomas
BY
ATTORNEYS United States Patent Office 2,703,034
Patented Mar. 1, 1955

2,703,034

AUTOMATIC PROJECTOR FILM LOADER AND THREADER

Leonard Lee Roy Thomas, Sacramento, Calif.

Application March 13, 1951, Serial No. 215,335

2 Claims. (Cl. 88—17)

This invention relates to automatic loaders for use upon motion picture projector machines and particularly to devices of this kind which are adapted to be mounted upon conventional projectors to automatically and properly thread the film through the conventional sprocket and film gate arrangement.

As is well known to those skilled in the art, the use of motion picture projectors in the home has increased substantially in recent years. As is also well known, substantially all of the commercial projectors adaptable for use in the home utilize a more or less standard type of construction in which film is fed continuously from a reel through a sprocket system, through a film gate intermittently in order that each frame of the film passes over a lighted aperture at a predetermined speed, and finally continuously about a sprocket and on to a reel upon which it is wound for subsequent storage. The sprockets to which I have referred rotate at a constant speed so that the film being fed over them is advanced at a predetermined continuous single rate of speed. However, film cannot be fed over a lighted aperture continuously but must be advanced intermittently at a predetermined rate. In order, therefore, to permit film to be fed over the sprockets and through the film gate, a certain amount of slack between the sprockets and the film gate is necessary to prevent the binding or tearing of the film. For this purpose it is standard practice to provide a free loop of film between the film gate and the sprockets. In other words, such loops are not guided over tracks or reels or sheaves, thus permitting the require fluctuation.

Threading the film has heretofore involved certain difficulties and has required a certain amount of technique on the part of the operator. Manufacturers of projectors have sought to reduce the difficulties involved by various means as, for example, by making the components of their projectors as large as possible to permit their easy handling by mounting the film gate upon hinges in order that the same may be swung out of the way and by making various elements retractable whereby the film may be properly positioned and the film gate repositioned over the film. However, most projectors have presented some difficulties in their loading.

It is an object of this invention to provide a simple type of loader which may be placed upon any conventional motion picture projector whereby the film may automatically be passed over both sprockets and through the film gate in a simple manner without removing the film gate from its proper position and without the necessity of the operator positioning the film within the film gate.

It is a further object of this invention to provide a device of this character in which adequate loops of film will be provided to compensate for the difference between the continuous motion of the sprockets and the intermittent motion of the means for advancing the film through the film gate.

Other objects and advantages of this invention will appear from the following specification taken in conjunction with the accompanying drawing in which:

Figure 1 is a fragmentary side elevational view of a motion picture projector illustrating the portion of the reels upon which the film is mounted, the film advancing mechanism and the film gate and lens units with my inventions mounted thereon;

Figure 2 is a detail of the upper film guide incorporating my invention;

Figure 3 is a detail of the lower film guide incorporating my invention;

Figure 4 is a cross-sectional elevation taken along the line 4—4 of Figure 2;

Figure 5 is a cross-sectional view taken along the line 5—5 of Figure 3;

Figure 6 is a view of the upper film guide illustrated in Figures 1 and 2, illustrating the portion of the loop of film therewithin when the film has been advanced by the film advancing claw;

Figure 7 is a detail view of the film guide illustrated in Figures 1, 2 and 6, illustrating the position of the film when the film is stationary with respect to the film gate; and Figure 8 is a schematic view of a film gate construction and illustrates the relationship of a typical film gate construction and the leading or advancing end of a strip of film.

As illustrated in Figure 1, the film 10 is adapted to be unwound from a reel 11, around a continuously rotating sprocket 12, through a film gate assembly 13, which will more fully hereinafter be described, around a carry-away sprocket 14 and onto a receiving reel 16. The film, reels, and film gate assembly illustrated are substantially standard and form no part of this invention. Those skilled in the art, however, will recall that the sprockets 12 and 14 are advanced at an identical predetermined continuous speed and that the film 10 is wound upon a continuously rotating reel 16. The film 10 is advanced through the film gate assembly 13 by a reciprocating jaw mechanism which is partially illustrated in Figure 8, which jaw is adapted to be extended through one of the perforations adjacent one side of the film, advance the same exactly one frame, be retracted, be elevated again, and then be extended to engage the next succeeding perforation in the film. While specific types of projectors may vary to some extent, the foregoing general description is, it is believed, sufficient to embrace all types of projectors. Each projector is provided with a lamp (not shown) whereby the image on the film is projected through a lens assembly 17 to a screen (not shown) upon which it is viewed.

As illustrated in Figures 2, 3, 4 and 5, I have provided a pair of devices 21 and 22 which are adapted to be secured to a projector in the manner generally illustrated in Figure 1. The device 21 is provided with a backing plate 23 to which there is secured a plurality of guides 24, 26, 27 and 28. It will be noted that the outer guide 24 is provided with three offsets 31, 32 and 33. The description of these guides, their critical shapes and functions will more fully hereinafter be described in connection with the description of the mode of operation of the entire device. The device 22 is also provided with a backing plate 36 and a plurality of guides 37, 38 and 39. The guide 37 is, it will be noted, also provided with offsets 41, 42 and 43. The further description of these guides, their critical shapes and functions will be made in conjunction with the description of the mode of operation of this device.

It will be noted that adjacent the outer edges of the guides 24 and 37, that is, that edge of the guides remote from the backing plates 23 and 36, are provided with a lip 46, whose function will also more fully hereinafter be described.

When the devices 21 and 22 are positioned on the projector generally as illustrated in Figure 1, the device 21 controls the path of the film 10 from the sprocket 12 to the film gate 13, while the device 22 controls the path of the film 10 from the film gate 13 to the sprocket 14.

The mode of operation of the devices 21 and 22 when positioned on a projector as illustrated in Figure 1 may briefly be described as follows: The leading edge 47 (see Figure 8) of the film 10 from the reel 11 is caused to engage the sprocket 12. The sprocket 12 is provided with teeth which are adapted to engage the conventional perforations along the side edge of the film 10 and advance the film. The leading edge of the film 10 will engage the guide 26 at about the position 26a and will follow the guide 26 around the curved inner portion thereof. The advancing end of the film 10 will next strike the guide 24 below the offset 31 and will tend to follow the normal curve of the guide 24 (see Figure 2) around its inner edge striking the guide 24 at points between the offsets 31 and 32 and between the offsets 32 and 33. The film will ultimately be guided downwardly between the end of the guide 24 and the guide 28 into a slot provided for the film in the film gate assembly 13. As the film is fed through the film gate the perforations in the film are engaged by a reciprocating claw (to be more fully explained) and the film is advanced through the film gate 13. The film is next urged straight downwardly until it engages the guide 37. It tends to follow the normal curve of the guide 37 (see Figure 3) striking the same between the offsets 41 and 42, and 42 and 43, ultimately striking the guide 39 which deflects the film over the sprocket 14. The sprocket 14, like the sprocket 12 is provided with teeth which are adapted to engage the perforations on the film and advance the film thereover.

As has previously been pointed out, the outer guides 24 and 37 are each provided with a plurality of offsets. The purpose of the offset is to provide extra area beyond the zone generally defined by the normal curve of the guides 24 and 37 (Figures 2 and 3) to receive excess looped film. As has previously been pointed out, excess film will be fed into this area because of the continuous feeding of the film over the sprocket 12 and the intermittent removal of the film from the area by the intermittent advance of the film through the film gate assembly 13. It is apparent, therefore, that there will be varying lengths of film 10 in the loop within this area. For this reason, if the outer guides 24 and 37 were not provided with offsets but were smooth, there would be no extra area into which excess film might be urged.

I have found that the size and shape of the offsets 31, 32 and 33 is important. For example, in the event the outer guide 24 were formed in a smooth curve, the film 10 would follow the inside of the curve and be in intimate contact therewith throughout its entire length. In the event, therefore, that more film 10 were urged into the area than were taken out for a short portion of a second, for example, the film 10 would tend to buckle.

As illustrated in Figure 6, the film is being advanced behind the film gate in such a manner that the loop between the sprocket 12 and the film gate 13 is at its shortest whereas in Figure 7, the loop of film between the sprocket 12 and the film gate 13 is at its greatest length because the film is being fed into but not out of the loop because the film in the film gate is stationary. It is apparent from an examination of these two drawings that the offsets 31, 32 and 33 are essential.

It will also be obvious from an examination of Figure 2 that the depth of the offset 32 is greater than the combined depths of the offsets 31 and 33. This is for the reason that the height or depth of the loop of film is greater than its width and the loop may be more quickly and easily distorted upwardly into the offset 32.

It will be apparent from the foregoing that the offsets 41, 42 and 43 are likewise required in the lower guide 37. Inasmuch as the film is being taken out of that area or zone, at a fixed continuous speed while it is being intermittently urged into the zone, the length of the film loop from the film gate 13 to the sprocket 14 is continuously varying and fluctuating. For the same reason, therefore, in the event the outer guide 37 were a smooth continuous curve the film would tend to buckle and bind.

It will be noted that I have provided a lip 46, around the inner edge of the guides 24 and 37. The lip 46 is provided along one side only as indicated and engages the film along that edge of the film which is provided with the perforations and upon which there is no print. In this way the area of frictional engagement between the guides and that portion of the film 10 upon which pictures occur is reduced to a minimum and substantially the only frictional engagement of the film with the guides is along that portion of the film adjacent the perforations. Frictional engagement of the film adjacent the perforations has no deleterious effect upon the film. An inwardly extending annular lip 48 might be provided to assure the positioning of the film laterally with respect to the guides. I have found that good results can be obtained without the lip 48 inasmuch as the normal effect of the lip 46 is to urge the film inwardly toward the back walls 23 and 36 respectively, and cause the same to closely hug the back wall as it advances through the units.

As illustrated in Figure 8, I have found it desirable to form the advancing end 47 of the film 10 in a particular manner, to facilitate its entrance into the film gate through which the film must pass. As indicated in Figure 8, the film gate is a narrow slot through which film is intermittently passed by the action of the claw 51. The advancing end of the film is provided with a cut-away portion as indicated in order to facilitate the introduction of the film into the film gate slot. When a portion of the film 10 has been introduced into the film slot, the cut-away side of the film will engage the guides 52 along the side of the slot and urge the perforated edge of the slot into engagement with the claw 51. I have found that a suitable shape of advancing edge for the film 10 may be formed by providing a 5° to 15° cut, as viewed in Figure 8, on that side of the film remote from the perforations, the length of the cut being approximately the length of the film gate assembly 13. I have also found it desirable to taper or round off the otherwise sharp corners generally as indicated in Figure 8.

As the film is fed from the assembly by the sprocket 14 it is caused to overlie the hub of the take-up sprocket 16. It will be noted that I have provided a member 53 on the hub of sprocket 16, said member 53 being provided with a plurality of radially extending teeth 54 which are positioned a predetermined distance apart, their distance being a multiple of the distance between the perforations on the film 10. As the film 10 is advanced outwardly from the sprocket 16 it tends to overlie the hub which, it will be recalled, is continuously rotating. As the hub rotates the teeth 54 engage the perforations on the film 10 and cause the same to wind about the hub and to be retained upon the sprocket 16.

I claim:

1. In a device for automatically threading a film having perforations along its length into a motion picture projector of the type having a rotatable pay-off reel, a feed sprocket rotating at a continuous speed for withdrawing film from the pay-off reel, a film gate for intermittently moving the film past the aperture in a lens system, a removal sprocket rotating continuously at the same speed as the feed sprocket, and a rotatable pickup reel for taking up the film as it is fed from the removal sprocket, the device comprising a pair of film guides, one of the film guides being mounted between the feed sprocket and the film gate, and the other being mounted between the film gate and the removal sprocket, each film guide being a unitary structure comprising a backing plate, an outer loop-shaped guiding surface fixed upon said backing plate, an inner guiding surface fixed to said backing plate and disposed near one end of said outer guiding surface to form a feed mouth whereby the film is forced to travel in proximity to the outer guiding surface and to generally follow the loop-shape of the outer guiding surface, an additional inner guiding surface fixed to said backing plate and disposed near the other end of said outer guiding surface to form a delivery mouth whereby the film in following the loop-shape of the outer guiding surface will be delivered in a predetermined direction, said film being advanced lengthwise into said feed mouth and out of said delivery mouth, at least one offset portion formed in said outer guiding surface, the loop in the film being formed by the inner and outer guiding surfaces in such a manner that a space remains between the film and the offset portions of the outer guiding surfaces and between the film and the inner guiding surfaces, said space allowing the entrance of the film loop as the size of the film loop varies within the guiding surfaces because of the periodic movement of the film past the lens system by action of the film gate and the continuous movement of the film by action of the continuously rotating film sprockets.

2. A device as in claim 1 wherein the surfaces of the inner and outer guiding surfaces that come in contact with the film are provided with a lip which extends along the length of the guiding surfaces and serves to prevent the film strip from contacting the guiding surfaces except along its perforated portions.

(References on following page)

References Cited in the file of this patent

UNITED STATES PATENTS

| Number | Name | Date |
|---|---|---|
| 1,225,184 | Segel | May 8, 1917 |
| 1,227,081 | Segel | May 22, 1917 |
| 1,260,185 | Gonsky | Mar. 19, 1918 |
| 1,298,393 | Proctor | Mar. 25, 1919 |
| 1,315,355 | Wenderhold | Sept. 9, 1919 |
| 1,346,356 | Wenderhold | July 13, 1920 |
| 2,461,471 | Jacobson | Feb. 8, 1949 |

FOREIGN PATENTS

| Number | Country | Date |
|---|---|---|
| 946,458 | France | Dec. 20, 1948 |